US012775665B2

(12) United States Patent
Levy et al.

(10) Patent No.: US 12,775,665 B2
(45) Date of Patent: Oct. 27, 2026

(54) GRAPH BUILDING USING LANGUAGE MODELS

(71) Applicant: PAYPAL, INC., San Jose, CA (US)

(72) Inventors: Ofek Levy, Tel-Aviv (IL); Yuval Yaron, Tel-Aviv (IL); Masha Goldgamer, Tel-Aviv (IL); Oria Domb, Tel-Aviv (IL)

(73) Assignee: PayPal, Inc., San Jose, CA (US)

( * ) Notice: Subject to any disclaimer, the term of this patent is extended or adjusted under 35 U.S.C. 154(b) by 88 days.

(21) Appl. No.: 18/766,564

(22) Filed: Jul. 8, 2024

(65) Prior Publication Data

US 2026/0010568 A1 Jan. 8, 2026

(51) Int. Cl.
*G06F 16/901* (2019.01)
*G06F 16/906* (2019.01)

(52) U.S. Cl.
CPC ........ *G06F 16/9024* (2019.01); *G06F 16/906* (2019.01)

(58) Field of Classification Search
CPC ........................... G06F 16/9024; G06F 16/906
USPC ........................................................... 707/740
See application file for complete search history.

(56) References Cited

U.S. PATENT DOCUMENTS 11,595,291 B2 * 2/2023 Chen ........................ G06N 3/09
12,087,413 B2 * 9/2024 Bulu ................... G06F 16/3344
12,141,186 B1 * 11/2024 Tomar ................... G06F 16/355
2023/0281249 A1 * 9/2023 Laliberte ............... G06F 40/134 715/208
2023/0401238 A1 * 12/2023 Khan .................... G06F 16/245
2024/0037112 A1 * 2/2024 Thunuguntla ......... G06F 16/835
2024/0320268 A1 * 9/2024 Mallipeddi ......... G06F 16/9038
2024/0354322 A1 * 10/2024 Mukherjee .......... G06F 16/3344
2024/0362412 A1 * 10/2024 Tsvetkov ............... G06N 20/00
2025/0139367 A1 * 5/2025 Manandise ........... G06F 40/211
2025/0279929 A1 * 9/2025 Savalle ............... H04L 41/0686
2025/0328577 A1 * 10/2025 Xu .......................... G06N 3/08
2025/0356673 A1 * 11/2025 Chavous ................ G06V 20/70

OTHER PUBLICATIONS

Jung, Dongin, et al., "Detecting Documents With Inconsistent Context", IEEE Access, vol. 10, Sep. 23, 2022, pp. 98970-98980.*
Liu, Sibei, et al., "Gated Multimodal Graph Learning for Personalized Recommendation", arXiv, Cornell University archive document No. arXiv:2506.00107v1 [cs. IR], May 30, 2025, downloaded from: https://arxiv.org/abs/2506.00107v1, pp. 1-9.*
Lyu, Hanjia, et al., "LLM-Rec: Personalized Recommendation via Prompting Large Language Models", arXiv, Cornell University archive document No. arXiv:2307.15780v3 [cs.CL], Apr. 2, 2024, downloaded from: https://arxiv.org/abs/2307.15780, pp. 1-30.*
Biswas, Russa, et al., "Cat2Type: Wikipedia Category Embeddings for Entity Typing in Knowledge Graphs", K-CAP '21, Virtual Event, USA, Dec. 2-3, 2021, pp. 81-88.*

* cited by examiner

*Primary Examiner* — Robert Stevens
(74) *Attorney, Agent, or Firm* — Greenberg Traurig, LLP

(57) ABSTRACT

The disclosed computer-implemented method may include determining a taxonomy of an object from its textual description and also standardized attributes of the object from the description and the taxonomy using a language model, according to embodiments. The method may also include building a graph data structure by using the standardized attributes for a node and connecting the node to other nodes using edges for common attributes. Various other methods, systems, and computer-readable media are also disclosed.

20 Claims, 8 Drawing Sheets

200

| Category | Attributes |
|---|---|
| Shirts/Tops | ['category', 'subcategory', 'gender', 'neckline', 'color', 'size', 'type', 'style', 'brand'] |
| Decals/stickers | ['category', 'subcategory', 'size', 'shape', 'design', 'brand', 'style', 'decal type', 'color'] |
| Games | ['category', 'subcategory', 'brand', 'type', 'theme', 'age range', 'number of players'] |
| Shoes | ['category', 'subcategory', 'gender', 'size', 'brand', 'color', 'type', 'style'] |
| Jewelry | ['category', 'subcategory', 'color', 'type', 'brand', 'material', 'style', 'gender'] |
| General | ['category', 'subcategory', 'color', 'type', 'brand', 'material', 'style', 'gender'] |

*FIG. 2A*

201

| Description | Standardized Description |
|---|---|
| Bag Straps Shoulder Strap Shoulder Strap Wide Strap Camera Bag Patterned Glitter Pink Gold Silver Hardware Gifts for Her | 'category': 'Accessories',<br>'subcategory': 'Shoulder Bags',<br>'color': 'Glitter Pink, Gold, Silver',<br>'type': 'Camera Bag',<br>'brand': 'Hardware',<br>'material': 'Patterned',<br>'style': 'Wide Strap',<br>'size': 'N/A',<br>'gender': 'Her' |
| Smart Tag Mini Locator GPS Tracker Work with Find My APP For Apple Replacement Key Wallet Bag Luggage Pet Finder | 'category': 'Smart Tracker',<br>'subcategory': 'GPS Tracker',<br>'color': 'N/A',<br>'type': 'Locator',<br>'brand': 'Smart Tag Mini',<br>'material': 'N/A',<br>'style': 'N/A',<br>'size': 'N/A',<br>'gender': 'N/A',<br>'Find My APP': 'For Apple',<br>'Replacement Key Wallet Bag Luggage Pet Finder': 'Yes' |

*FIG. 2B*

GRAPH BUILDING USING LANGUAGE MODELS

BRIEF DESCRIPTION OF THE DRAWINGS

The accompanying drawings illustrate a number of exemplary embodiments and are a part of the specification. Together with the following description, these drawings demonstrate and explain various principles of the present disclosure.

FIGS. 2A-B are exemplary tables of item attributes.

Figure 1A:
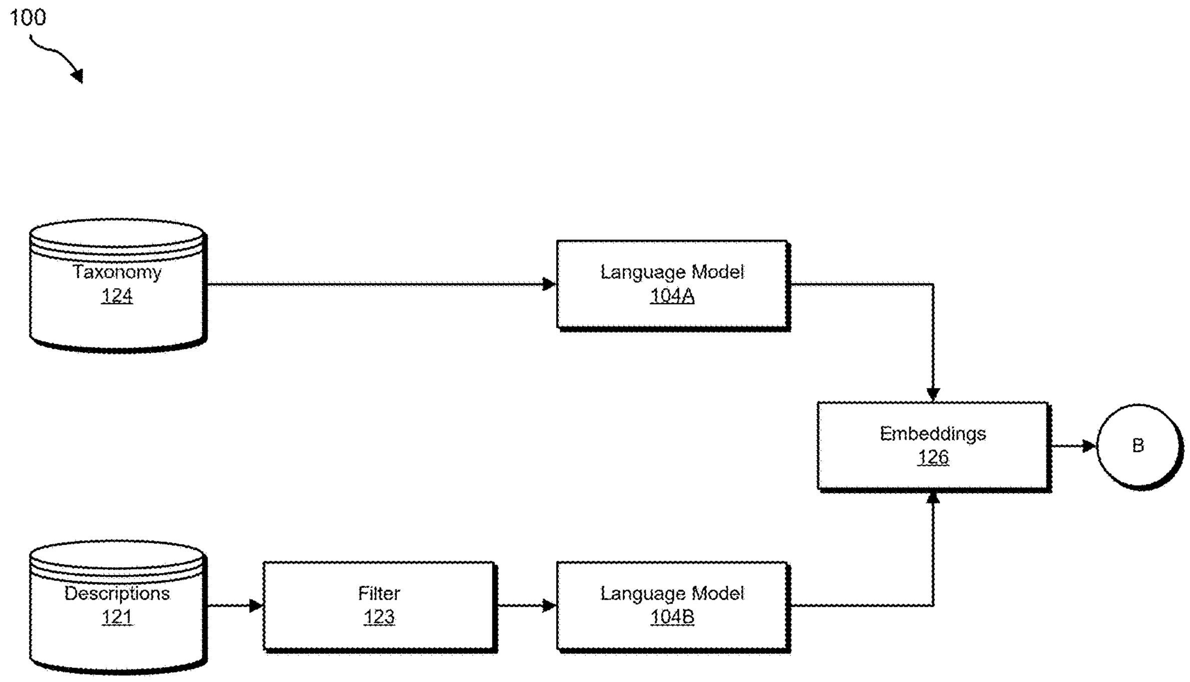
FIGS. 1A-C are a flow diagram of an exemplary graph building using language models.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims. Note that the term "exemplary" as used herein does not imply or suggest that a particular implementational detail or aspect, is required, necessary, or preferred; instead, the term merely indicates an example and is not intended to foreclose other possible implementations and embodiments.

DETAILED DESCRIPTION OF EXEMPLARY EMBODIMENTS

Graph building provides an effective way to organize large amounts of data for efficient analysis, such as recognizing relationships. For example, cataloguing a large number of items may be more effective by representing each item as a node, and common attributes between items as edges between corresponding nodes. Many types of items may be categorized as such. For example, the items may be products connected by edges corresponding to similar features (e.g., color, brand, etc. as will be described further below).

For further analysis, graphs may be connected or otherwise combined with other graphs. For instance, the product graph may be connected to another graph representing merchants (e.g., connecting products to merchants selling the products) and further connected to yet another graph representing consumers (e.g., connecting products to consumers who have purchased the products). Graph-based analysis, such as using a machine learning (ML) model or other analysis, may reveal trends, relationships, etc.

Effective analysis may require well-built graphs in which items are not mistakenly duplicated, edges are standardized, etc. However, building good graphs may be challenging when using disparate and/or non-uniform sources. For example, merchants may use different identifiers for the same item, different descriptors for the same attribute, as well as other discrepancies that may manifest in a graph.

The present disclosure is generally directed to effective and efficient graph building from disparate sources using one or more language models. As will be explained in greater detail below, embodiments of the present disclosure may determine an object/item's taxonomy based on a text description of the object using a first language model and determine, using a second language model, attributes of the object from the text description and the taxonomy. The systems and methods described herein may build a more effective graph using these attributes. By using the language models for determining object taxonomies and attributes, the systems and methods provided herein may improve the functioning of a computer itself by reducing storage requirements for a graph (e.g., through better deduplication and standardization/uniformity of values) as well as more efficiently manage computing resources (e.g., reducing processing needs for maintaining/updating a graph such as by front-loading the graph building). In addition, the systems and methods provided herein further improve the technical field of data analysis and graph analysis by providing improved graph building, allowing for more efficient processing during analysis (e.g., more effective analysis from uniform graph values as well as reducing overhead incurred for addressing duplicated data).

Features from any of the embodiments described herein may be used in combination with one another in accordance with the general principles described herein. These and other embodiments, features, and advantages will be more fully understood upon reading the following detailed description in conjunction with the accompanying drawings and claims.

The following will provide, with reference to FIGS. 1A-6, detailed descriptions of graph building using language models. Detailed descriptions of an example process will be provided in connection with FIGS. 1A-C. Detailed descriptions of example attributes and graphs will be provided in connection with FIGS. 2 and 3. Detailed descriptions of a corresponding example method will be provided in connection with FIG. 4. In addition, detailed descriptions of example systems for performing the described methods/processes will be provided in connection with FIGS. 5 and 6.

Figure 1B:
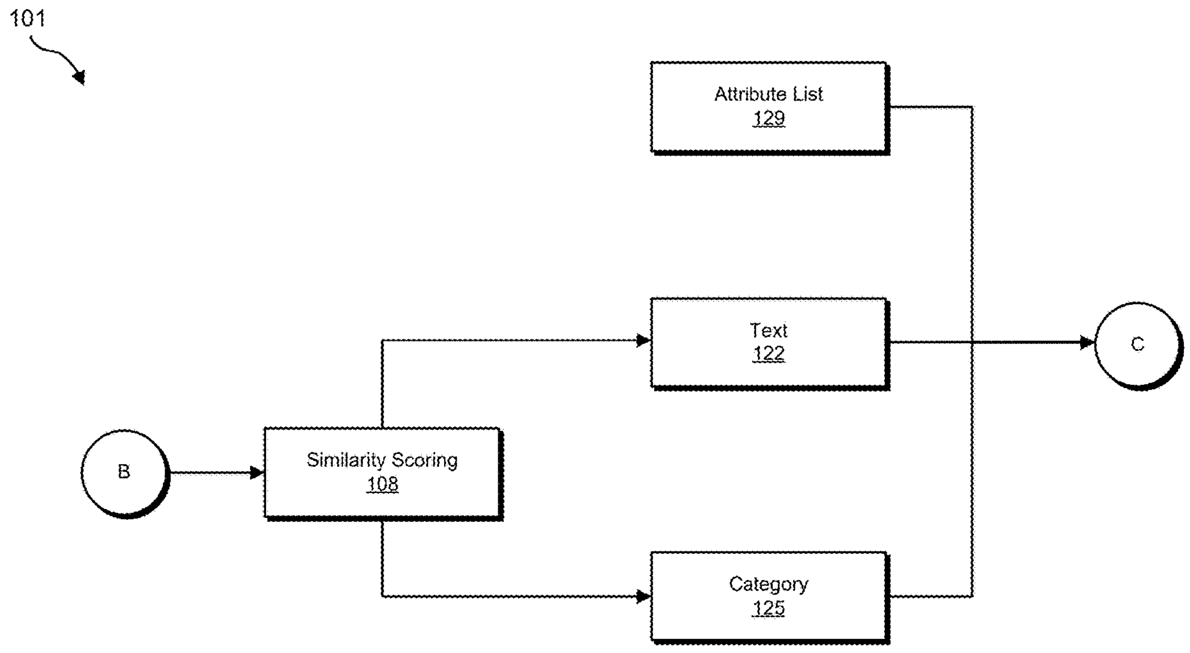
Figure 1C:
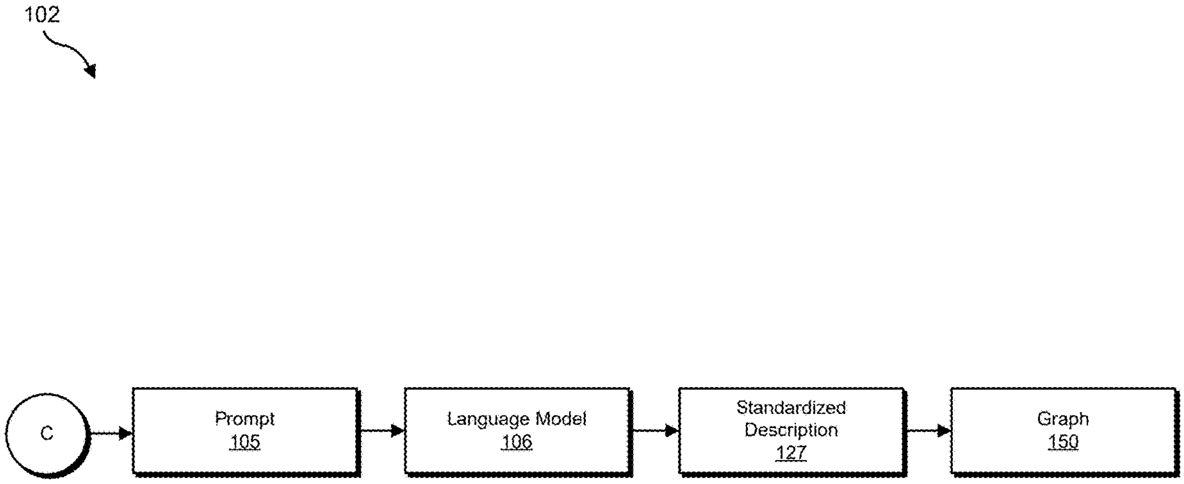

FIGS. 1A-1C illustrate an example process for graph building using language models as a flowchart in three parts. Starting with flowchart 100 in FIG. 1A, the process may begin with a taxonomy 124 and descriptions 121. Taxonomy 124 represents, for example, a set of taxonomies or categories for objects to be evaluated for the graph building. For example, taxonomy 124 may correspond to a database of item categories, product categories, etc. In addition, the categories in taxonomy 124 may correspond to category hierarchies rather than individual categories. For instance, rather than "shoes," a category value may instead be "apparel>shoes" (using any appropriate delimiter) such that each category value may incorporate an overall hierarchy of categories. In other examples, the category hierarchy may be explicitly stored (e.g., using a series of categories and subcategories). In some examples, taxonomy 124 may be generated from or otherwise incorporate a pre-existing taxonomy of objects.

Descriptions 121 may correspond to a dataset of textual descriptions of the objects, such as a databased of item descriptions, product descriptions, etc. As will be described further herein, a category for an item (e.g., from taxonomy 124) may be selected using a textual description of the item. In some implementations, each textual description in descriptions 121 may represent an item for which a matching taxonomy/category from taxonomy 124 may be found.

As described above, textual descriptions of objects (e.g., item descriptions or product descriptions) may not be standard and/or may otherwise vary in quality of information. Descriptions 121 may be generated from scraping various sources for object information. As such, some textual descriptions may offer little or no information or otherwise be non-descriptive text (e.g., a generic/default product description, empty descriptions, etc.). Accordingly, a filter 123 may optionally be applied to filter out such non-descriptive text. Filter 123 may apply, for example, pattern/word recognition, minimum character length, and/or other filtering thresholds to filter out (e.g., remove from processing) textual descriptions failing to meet the filtering thresholds.

The textual descriptions from descriptions 121 (which may be filtered through filter 123) may be input into a language model 104B to generate item description embeddings. Language model 104B may correspond to any language model (e.g., a probabilistic model of a natural language or any other natural language processing). In some examples, language model 104B may correspond to a language agnostic sentence transformer model which in some examples refers to a model for transforming phrases/sentences/words (e.g., groups of one or more words) into embeddings (e.g., low dimensional mappings of discrete variables; in some implementations embeddings may be vectors of continuous numbers that reduce a dimensionality of categorical variables), and further may be language agnostic in that the model may not be limited to a particular language. Language model 104B may be pre-trained or otherwise trained before inputting textual descriptions from descriptions 121.

On a relatively parallel track (although not necessarily simultaneous), a language model 104A may generate item category embeddings from the taxonomies/categories from taxonomy 124. Language model 104A may correspond to any language model, which may include a language agnostic sentence transformer model, and in some implementations may be the same model as language model 104B. Language model 104A may be pre-trained or otherwise trained before inputting categories from taxonomy 124.

Embeddings allow ML models to analyze lower dimensional vectors. Further, within the embedding space, vectors (e.g., embeddings) that are close to each other represent semantically similar inputs, such that closer vectors represent more semantically similar inputs. Thus, by analyzing the item category embeddings from language model 104A and the item description embeddings from language model 104B (collectively represented as embeddings 126 in FIG. 1A) items may be matched with similar categories.

More specifically, turning to a flowchart 101 illustrated in FIG. 1B, embeddings 126 may be analyzed with a similarity scoring 108. A similarity score between embeddings may correspond to, for example, a distance between the embedding vectors (e.g., based on a cosine similarity, a dot product, or other similarity calculation). Embeddings having a similarity score above a similarity score threshold (e.g., 0.5 on a 0 to 1 scale, or other appropriate value) may then be used to match item descriptions and to their closest categories, such as text 122 (e.g., the textual description from descriptions 121 corresponding to one of the matching embeddings) and category 125 (e.g., the category from taxonomy 124 corresponding to the other of the matching embeddings). In some examples, a highest similarity score may be used such that each textual description may be matched with one category, although in other examples, more than one and/or all matches may be used. Accordingly, using language model 104A and/or language model 104B allows selecting a category (e.g., category 125) for an item using a textual description (e.g., text 122) of the item.

An attribute list 129 may also be identified for category 125. Attribute list 129 may correspond to a standard list of attributes for a given category (e.g., category 125). In some implementations, attribute list 129 may be predefined, such as pre-generated from a language model, manually configured, etc. The attributes may correspond to features describing an object and may correspond to relevant features for describing an object in the given category. For example, for a category of "shape>circle," relevant attributes may include "radius." FIG. 2A illustrates a table 200 of example attributes for categories. Although FIG. 2A illustrates limited examples of product categories, the categories and attributes described herein may correspond to other types of objects. As will be described further below, having a standard list of attributes for a given category allows standardized definitions (and identification) of objects in the category.

Turning now to a flowchart 102 illustrated in FIG. 1C, attribute list 129, text 122, and category 125 may be used to generate a prompt 105 for inputting into a language model 106. Language model 106 may correspond to any language model or generative artificial intelligence (e.g., a model capable of generating text and/or other data such as images/video), such as a large language model (LLM) that may use a transformer architecture (e.g., tokenizing each word and converting into an embedding) for language generation and/or classification. Accordingly, prompt 105 may correspond to an instruction for language model 106 to perform a specific task. In some implementations, the specific task may be to generate a specific item description (e.g., a standardized description 127) for the item corresponding to text 122 by using text 122 and/or category 125 to determine values for each attribute in attribute list 129. Thus, standardized description 127 may correspond to an enumerated list of attribute/value pairs, such as "category:shape>circle" and "radius:5." FIG. 2B illustrates a table 201 of example standardized descriptions of products generated from textual descriptions of the products, although in other example, the systems and methods provided herein may apply to any other types of objects.

Figure 3A:
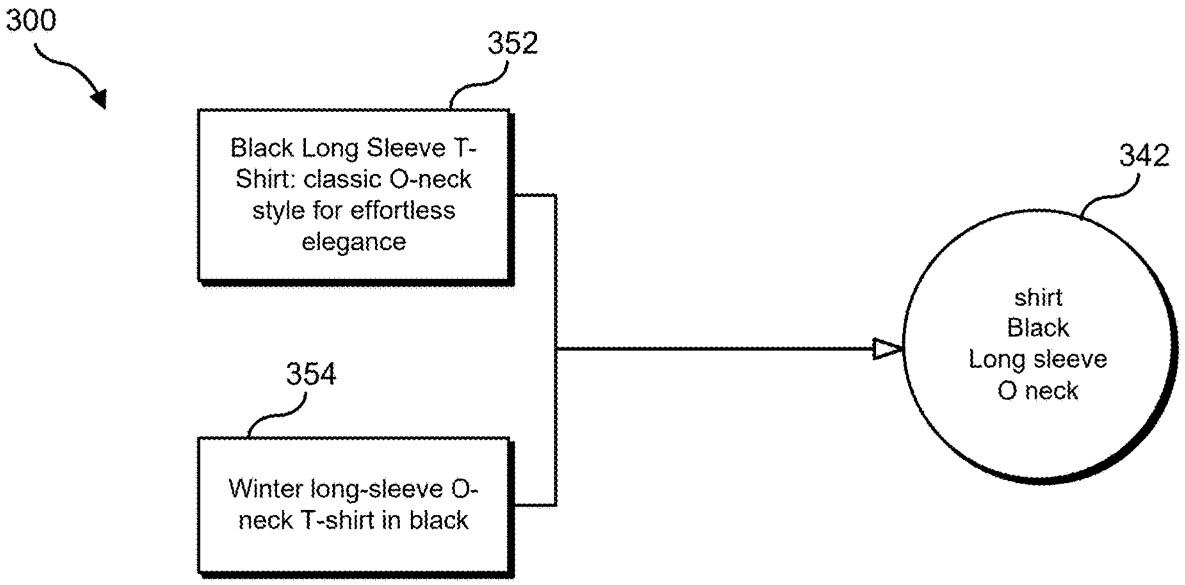
FIGS. 3A-B are exemplary graph nodes and edges.

Returning to FIG. 1C, standardized description 127 may be used to build a graph 150. In some examples, an object may be represented in graph 150 as a node, and edges of the node may connect to other nodes based on shared values for the standardized attributes of the objects. FIG. 3A illustrates an example 300 of a node 342 for a graph (e.g., graph 150).

In FIG. 3A, a textual description 352 (corresponding to an instance of text 122) may be processed, as described herein, to generate node 342. More specifically, the textual description "black long sleeve t-shirt: classic O-neck style for effortless elegance" may be converted to standardized description of "shirt, black, long sleeve, O neck." The standardized description may be used to define a node (e.g., node 342).

By outputting standardized attributes (as standardized description 127), different textual descriptions of the same object may be standardized and recognized as the same object. For example, two textual descriptions may appear different, but when comparing the generated standardized descriptions, having the same values for attributes indicates the same item. For instance, in FIG. 3A, a textual description 354 (corresponding to another instance of text 122) may include the text "Winter long-sleeve O-neck T-shirt in black." However, after processing textual description 354 (e.g., by identifying embeddings 126, matching embeddings to match text 122 to category 125 and identify attribute list 129 for prompt 105, and generating standardized description 127 as described above), the standardized attributes for textual description 354 may match those of textual description 352. Having the same standardized description may prevent adding another node for the same item (e.g., having common values for the standard list of attributes may identify the same item). Identifying the same item may prevent duplication of nodes in the graph. In other words, since a node (e.g., node 342) may already exist, a new node with the same values may not be created or added to the graph.

Figure 3B:
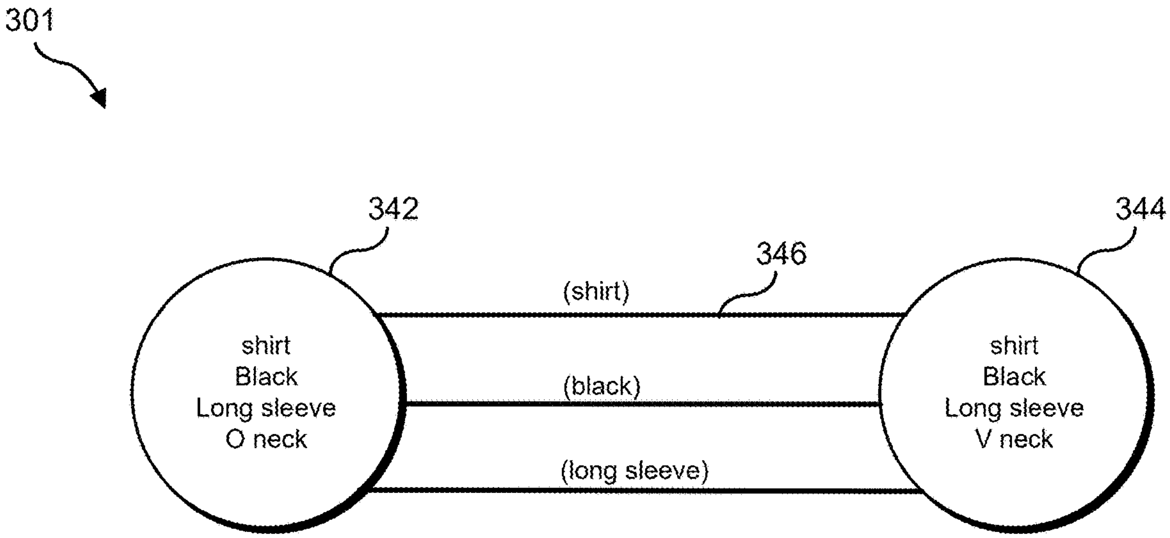

In addition, after adding a node (e.g., node 342), the node may be connected to other nodes based on attribute values, although connecting nodes may occur at any appropriate moments (e.g., after adding/removing a new node, periodically refreshing the graph, before/after analyzing the graph, etc.). FIG. 3B illustrates an example graph 301 in which node 342 may be connected to a node 344 with one or more edges 346. Edges 346 may represent common values for attributes. For example, in FIG. 3B, node 344 may have a standardized description of "shirt, black, long sleeve, V neck" such that node 344 shares values with node 342, namely "shirt," "black," and "long sleeve," represented by edges 346. Thus, a graph relating objects may be efficiently generated and stored.

In some examples, the graph may include other graphs/nodes to allow further analysis, such as user nodes (representing user entities) connected to object/item nodes for identifying relationships between user entities and objects/items in the graph. For example, if the object corresponds to items such as products, additional user entities such as merchants and customers/purchasers may be represented by merchant nodes and customer nodes, respectively. For example, a merchant may be identified by a unique merchant identifier or ID, and in some examples a merchant node may include additional information (e.g., name, platform, location, etc.). A merchant node may be connected to items sold by the merchant. A customer may be identified by a unique customer ID, and in some examples a customer node may include additional information (e.g., location, other demographic information, etc.). A customer node may be connected to items purchased by the customer, and in some examples, transaction details may also be stored or otherwise linked to the customer and/or item.

By generating a graph of objects having standardized and deduplicated data, further analysis of relationships between objects and/or user entities may be feasible, particularly for a large number of represented objects. For example, in the merchant/consumer example, relationships between consumers (e.g., types of consumers) and objects (e.g., types of items/products) may provide better recommendations to consumers and/or merchants.

Figure 4:
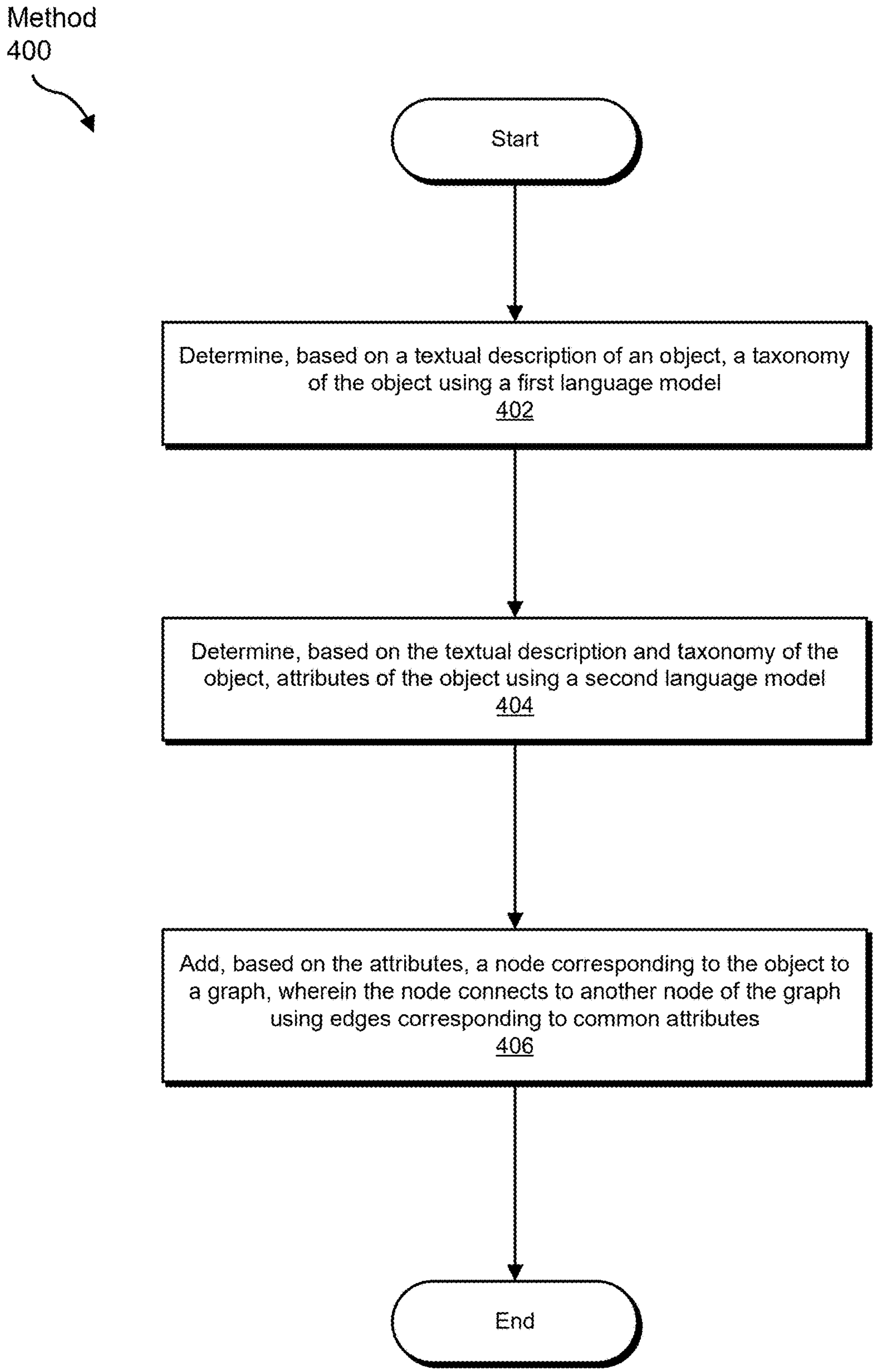
FIG. 4 is a flow diagram of an exemplary method for graph building using language models.

FIG. 4 is a flow diagram of an exemplary computer-implemented method 400 for graph building using language models. The steps shown in FIG. 4 may be performed by any suitable computer-executable code and/or computing system, including the system(s) illustrated in FIGS. 5 and/or 6. In one example, each of the steps shown in FIG. 4 may represent an algorithm whose structure includes and/or is represented by multiple sub-steps, examples of which will be provided in greater detail below.

As illustrated in FIG. 4, at step 402 one or more of the systems described herein may determine, based on a textual description of an object, a taxonomy of the object using a first language model. For example, a language model 504 (corresponding to language model 104A and/or language model 104B) may determine a taxonomy (e.g., from taxonomies 524) based on a text 522.

Figure 5:
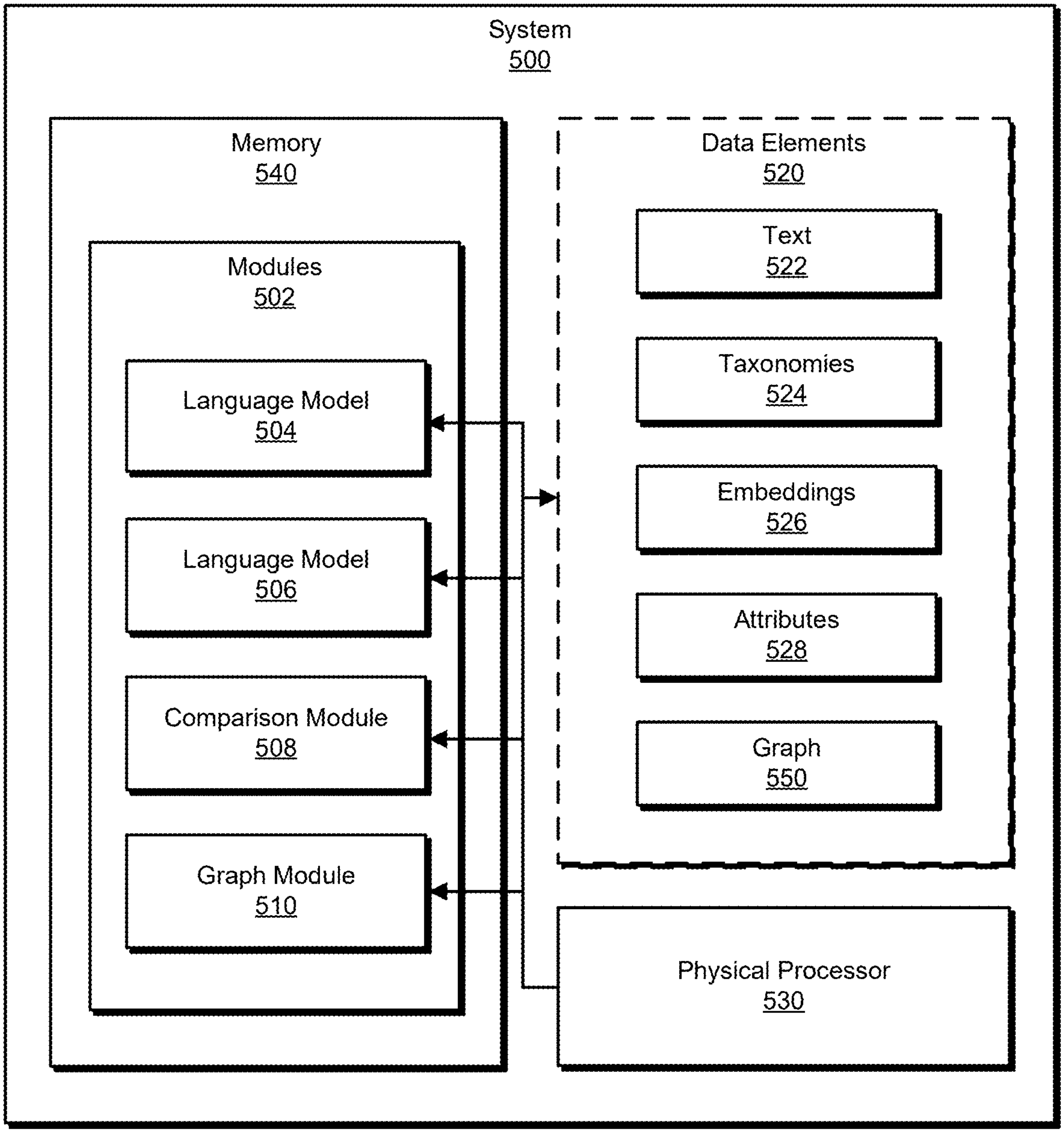
FIG. 5 is a block diagram of an exemplary system for graph building using language models.

Various systems described herein may perform the processes described herein. FIG. 5 is a block diagram of an example system 500 for graph building using language models. As illustrated in this figure, example system 500 may include one or more modules 502 for performing one or more tasks. As explained in greater detail herein, modules 502 may include language model 504, language model 506 (corresponding to language model 106), a comparison module 508 (corresponding to similarity scoring 108), and a graph module 510 (e.g., for building graphs as described herein). Although illustrated as separate elements, one or more of modules 502 in FIG. 5 may represent portions of a single module or application.

In certain embodiments, one or more of modules 502 in FIG. 5 may represent one or more software applications or programs that, when executed by a computing device, may cause the computing device to perform one or more tasks. For example, and as will be described in greater detail below, one or more of modules 502 may represent modules stored and configured to run on one or more computing devices, such as the devices illustrated in FIG. 6 (e.g., computing device 602 and/or server 606). One or more of modules 502 in FIG. 5 may also represent all or portions of one or more special-purpose computers configured to perform one or more tasks.

As illustrated in FIG. 5, example system 500 may also include one or more memory devices, such as memory 540. Memory 540 generally represents any type or form of volatile or non-volatile storage device or medium capable of storing data and/or computer-readable instructions. In one example, memory 540 may store, load, and/or maintain one or more of modules 502. Examples of memory 540 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 5, example system 500 may also include one or more physical processors, such as physical processor 530. Physical processor 530 generally represents any type or form of hardware-implemented processing unit capable of interpreting and/or executing computer-readable instructions. In one example, physical processor 530 may access and/or modify one or more of modules 502 stored in memory 540. Additionally or alternatively, physical processor 530 may execute one or more of modules 502 to build a graph. Examples of physical processor 530 include, without limitation, microprocessors, microcontrollers, Central Processing Units (CPUs), Field-Programmable Gate Arrays (FPGAs) that implement softcore processors, Application-Specific Integrated Circuits (ASICs), graphics processing units (GPUs), hardware accelerators, co-processors, portions of one or more of the same, variations or combinations of one or more of the same, and/or any other suitable physical processor.

As illustrated in FIG. 5, example system 500 may also include one or more data elements 520, such as text 522 (representing textual descriptions described herein, such as text 122), taxonomies 524 (corresponding to taxonomy 124), embeddings 526 (corresponding to embeddings 126), attributes 528 (corresponding to attribute list 129 and/or values thereof), and a graph 550 (corresponding to graph 150). One or more of data elements 520 may be stored on a local storage device, such as memory 540, or may be accessed remotely.

Example system 500 in FIG. 5 may be implemented in a variety of ways. For example, all or a portion of example system 500 may represent portions of example network environment 600 in FIG. 6.

Figure 6:
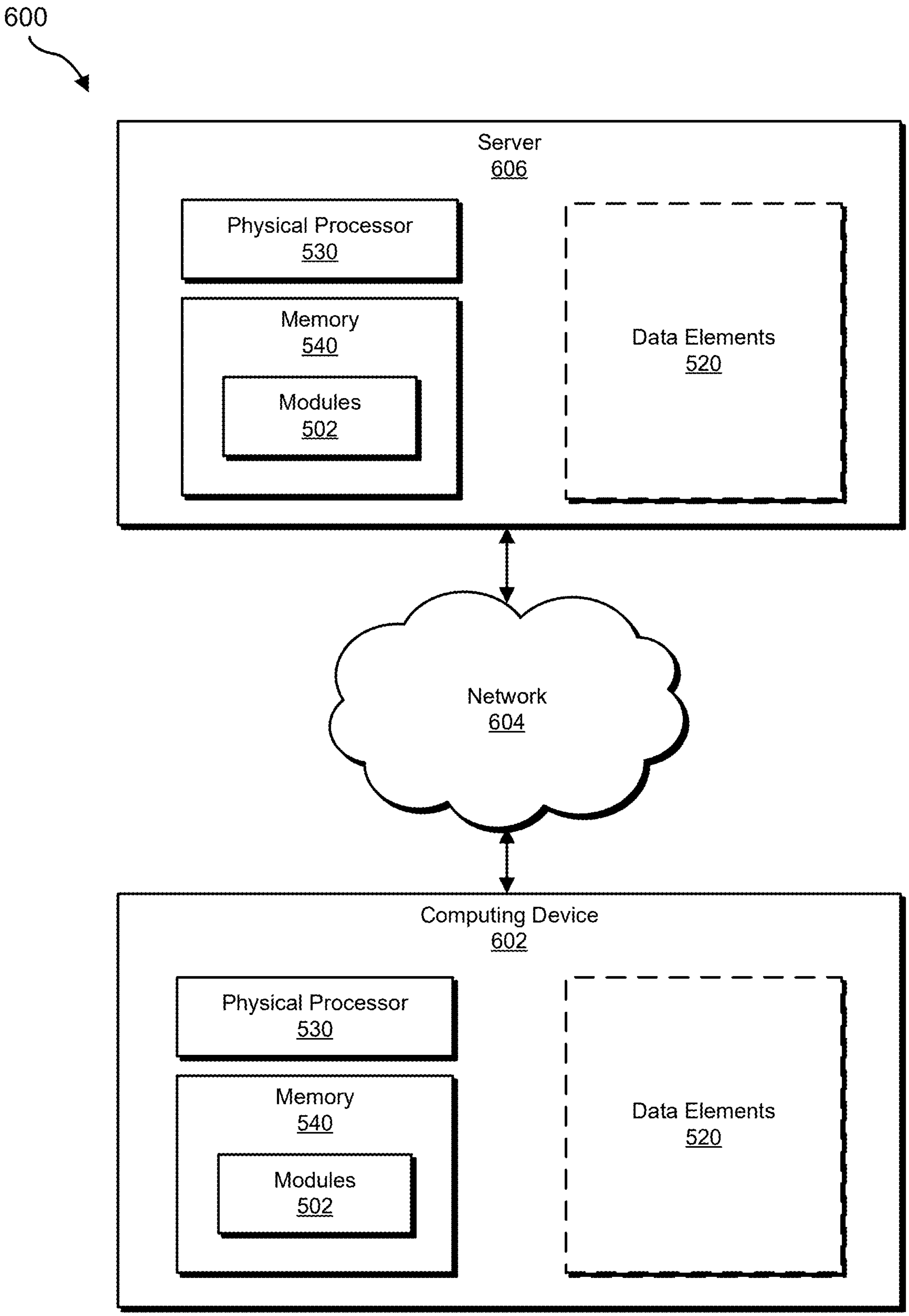
FIG. 6 is a block diagram of an exemplary network for graph building using language models.

FIG. 6 illustrates an exemplary network environment 600 implementing aspects of the present disclosure. The network environment 600 includes computing device 602, a network 604, and server 606. Computing device 602 may be any computing device, such as a desktop computer, laptop computer, tablet device, smartphone, a server, or other computing device. Computing device 602 may include a physical processor 530, which may be one or more processors, memory 540, which may store data such as one or more of data elements 520.

Server 606 may represent or include one or more servers capable of hosting language models described herein. Server 606 may include a physical processor 530, which may include one or more processors, memory 540, which may store modules 502, and one or more of data elements 520.

Computing device 602 may be communicatively coupled to server 606 through network 604. Network 604 may represent any type or form of communication network, such as the Internet, and may comprise one or more physical connections, such as LAN, and/or wireless connections, such as WAN.

Returning to FIG. 4, the systems described herein may perform step 402 in a variety of ways. In one example, determining the taxonomy (e.g., category 125) may include generating embeddings of the textual description using the first language model (e.g., language model 104B) and matching the embeddings to a closest taxonomy in an embedding space, as described above. In some examples, matching the embeddings comprises comparing the embeddings to a predetermined set of taxonomy embeddings (e.g., applying similarity scoring to embeddings 126).

In some examples, the predetermined set of taxonomy embeddings are generated from applying the language agnostic sentence transformer model (e.g., language model 104A) to a set of taxonomies (e.g., taxonomy 124). In some examples, matching the embeddings corresponds to a similarity score above a threshold similarity, as described above.

At step 404 one or more of the systems described herein may determine, based on the textual description and the taxonomy of the object, attributes of the object using a second language model. For example, language model 506 may determine attributes 528.

The systems described herein may perform step 404 in a variety of ways. In one example, determining the attributes includes prompting the second language model with the textual description, the taxonomy, and a list of attributes variables (e.g., prompt 105), and outputting the attributes based on the prompting. As described above, in some examples, determining the attributes of the object provides a standardized description of the object.

At step 406 one or more of the systems described herein may add, based on the attributes, a node corresponding to the object to a graph, wherein the node connects to another node of the graph using edges corresponding to common attributes. For example, graph module 510 may add a node to graph 550 based on attributes 528.

The systems described herein may perform step 406 in a variety of ways. In one example, adding the node based on the attributes prevents adding a duplicate node for the object to the graph. In some examples, graph module 510 may further connect a related entity node to the node, allowing graph analysis as described herein.

As detailed above, payment service providers/platforms may be able to provide additional services to merchants based on the merchant's product catalog. However, payment service providers traditionally have limited access to the product catalog being sold by its merchants, and often only has access to an abstract product description provided by the merchant. The ability to determine which products are sold using the platform may be a factor for different platform services, such as product/merchant recommendations, customer segmentation, shopper insights, etc. In addition, two merchants may sell the same product but describe it with different text and/or other identifiers (e.g., SKU identifiers). Accordingly, it may be difficult to organize products into a unified catalog when being fed from different merchant sources.

The systems and methods described herein provide an attributes extraction system based on disparate sources, such as the product descriptions provided by merchants, enabling graph representation of the products. Unique products may be represented as vertices in the graph representation and may further be connected to merchants selling them.

The attribute extraction may include determining the product category by using a few-shot language model. This step may use a pre-defined list of product categories, which is used to classify each product description into a different category. A pre-trained language model may be applied to the product categories to get their embeddings.

During the classification process, the system may calculate the embedding for each product description and find the closest category in the embedding space (based on similarity measurement, for example, cosine similarity). This may provide the category for each product description.

The attribute extraction may also include extracting the product attributes using an LLM. A prompt for the LLM may include: the product description, the product category (e.g., as previously calculate), and a list of pre-defined product attributes (to be extracted from the product description by the LLM). The LLM may be prompted to output only the product attributes that were specified in the prompt.

The attribute extraction may further include building a graph representation of all products and the merchants who sell them. The nodes in the graph may represent merchants or products. In the case where the node represents a product, the node may include its attributes (that were extracted by the LLM) as properties of the node. In the graph, merchants may be connected to the products that they sell.

The systems and methods described herein allow itemizing products based on their free-text description using a multi-step process incorporating both small & large language models, which benefits from the advantages of the lean few-shot models, while supporting the LLM predictions to improve its performance. This pipeline provides improved methods for itemization of products. In addition, the graph representation of products using its attributes may enables various insights and applications that may be limited in other representation methods.

In some aspects, the techniques described herein relate to a system including: a processor; and a non-transitory computer-readable medium having stored thereon instructions that are executable by the processor to cause the system to perform operations including: generating item category embeddings for item categories using a language agnostic sentence transformer model; identifying embeddings for an item based on a textual description of the item using the language agnostic sentence transformer model; matching the embeddings to the item category embeddings to determine a closest item category for the item; prompting a large language model with the closest item category and the textual description to output standardized attributes of the item; and building a graph representation of items, wherein the item is represented by a node and edges connect the node to another item node based on shared values for the standardized attributes of the item.

In some aspects, the techniques described herein relate to a system, further including instructions for: identifying second embeddings for a second item based on a second textual description of the second item using the language agnostic sentence transformer model; matching the second embeddings to the item category embeddings to determine a second closest item category for the second item; and prompting the large language model with the second closest item category and the second textual description to output second standardized attributes of the second item, wherein the second standardized attributes of the second item matching the standardized attributes of the item prevents adding a second node for the second item.

In some aspects, the techniques described herein relate to a system, further including instructions for: adding a merchant node to the graph, wherein the merchant node is connected to the node to represent a merchant of the item.

In some aspects, the techniques described herein relate to a system, further including instructions for: adding a customer node to the graph, wherein the customer node is connected to the node to represent a purchaser of the item.

In some aspects, the techniques described herein relate to a system, wherein the item categories correspond to category hierarchies for items.

In some aspects, the techniques described herein relate to a system, further including instructions for filtering the textual description for non-descriptive text.

In some aspects, the techniques described herein relate to a non-transitory computer-readable medium having stored thereon instructions that are executable by a processor of a computing system to cause the computing system to perform operations including: selecting a category for an item using a textual description of the item with a first language model; identifying a standard list of attributes for the category; determining values for the standard list of attributes using the textual description and the category with a second language model; and graphing a representation of items by adding a node to the graph representation for the item using the values as edges for connecting to other nodes.

In some aspects, the techniques described herein relate to a non-transitory computer-readable medium, wherein the values for the standard list of attributes identifies same items based on common values.

In some aspects, the techniques described herein relate to a non-transitory computer-readable medium, wherein identifying the same items prevents duplication of nodes in the graph representation.

In some aspects, the techniques described herein relate to a non-transitory computer-readable medium, further including instructions for adding a user node connected to the node corresponding to a user entity related to the item.

In some aspects, the techniques described herein relate to a non-transitory computer-readable medium, further including instructions for identifying relationships between the user entity and items in the graph representation.

In some aspects, the techniques described herein relate to a computer-implemented method including: determining, based on a textual description of an object, a taxonomy of the object using a first language model; determining, based on the textual description and the taxonomy of the object, attributes of the object using a second language model; and adding, based on the attributes, a node corresponding to the object to a graph, wherein the node connects to another node of the graph using edges corresponding to common attributes.

In some aspects, the techniques described herein relate to a computer-implemented method, wherein determining the taxonomy further includes: generating embeddings of the textual description using the first language model, wherein the first language model corresponds to a language agnostic sentence transformer model; and matching the embeddings to a closest taxonomy in an embedding space.

In some aspects, the techniques described herein relate to a computer-implemented method, wherein matching the embeddings includes comparing the embeddings to a predetermined set of taxonomy embeddings.

In some aspects, the techniques described herein relate to a computer-implemented method, wherein the predetermined set of taxonomy embeddings are generated from applying the language agnostic sentence transformer model to a set of taxonomies.

In some aspects, the techniques described herein relate to a computer-implemented method, wherein matching the embeddings corresponds to a similarity score above a threshold similarity.

In some aspects, the techniques described herein relate to a computer-implemented method, wherein determining the attributes further includes: prompting the second language model with the textual description, the taxonomy, and a list of attributes variables, wherein the second language model corresponds to a large language model; and outputting the attributes based on the prompting.

In some aspects, the techniques described herein relate to a computer-implemented method, wherein determining the attributes of the object provides a standardized description of the object.

In some aspects, the techniques described herein relate to a computer-implemented method, wherein adding the node based on the attributes prevents adding a duplicate node for the object to the graph.

In some aspects, the techniques described herein relate to a computer-implemented method, further including connecting a related entity node to the node.

As detailed above, the computing devices and systems described and/or illustrated herein broadly represent any type or form of computing device or system capable of executing computer-readable instructions, such as those contained within the memory devices described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), hardware accelerators, graphics processing units (GPUs), co-processors, portions of one or more of the same, variations or combinations of one or more of the same, or any other suitable physical processor.

Although described/illustrated as separate elements, the instructions described and/or illustrated herein may represent portions of a single instruction, code, program, and/or application. In addition, in certain embodiments one or more of these instructions may represent one or more software applications or programs that, when executed by a computing device, may cause the computing device to perform one or more tasks. For example, one or more of the instructions described and/or illustrated herein may represent instructions stored and configured to run on one or more of the computing devices or systems described and/or illustrated herein. One or more of these instructions may also represent all or portions of one or more special-purpose computers configured to perform one or more tasks.

In addition, one or more of the modules described herein may transform data, physical devices, and/or representations of physical devices from one form to another. For example, one or more of the instructions recited herein may receive text data to be transformed, transform the text, output a result of the transformation to build a graph representation, use the result of the transformation to analyze the graph representation, and store the result of the transformation to maintain the graph representation. Additionally or alternatively, one or more of the instructions recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A system comprising:

a processor; and a non-transitory computer-readable medium having stored thereon instructions that are executable by the processor to cause the system to perform operations comprising:

generating item category embeddings for item categories using a language agnostic sentence transformer model;

identifying embeddings for an item based on a textual description of the item using the language agnostic sentence transformer model;

matching the embeddings to the item category embeddings to determine a closest item category for the item based on a distance similarity score measurement of the embeddings;

prompting a language model with the closest item category and the textual description to output standardized attributes of the item; and building a graph of items using distance similarity score measurements to prevent data duplication, wherein the item is represented by a node and edges connect the node to another item node based on shared values for the standardized attributes of the item.

2. The system of claim 1, further comprising instructions for:

identifying second embeddings for a second item based on a second textual description of the second item using the language agnostic sentence transformer model;

matching the second embeddings to the item category embeddings to determine a closest item category for the second item based on a second distance similarity score measurement; and prompting the language model with the closest item category for the second item and the second textual description to output second standardized attributes of the second item, wherein the second standardized attributes of the second item matching the standardized attributes of the item prevents adding a second node for the second item.

3. The system of claim 1, further comprising instructions for:

adding a merchant node to the graph, wherein the merchant node is connected to the node to represent a merchant of the item.

4. The system of claim 1, further comprising instructions for:

adding a customer node to the graph, wherein the customer node is connected to the node to represent a purchaser of the item.

5. The system of claim 1, wherein the item categories correspond to category hierarchies for items.

6. The system of claim 1, further comprising instructions for filtering the textual description for non-descriptive text.

7. A non-transitory computer-readable medium having stored thereon instructions that are executable by a processor of a computing system to cause the computing system to perform operations comprising:

selecting a category for an item using a textual description of the item with a first language model;

identifying a standard list of attributes for the category;

determining values for the standard list of attributes using the textual description and the category with a second language model; and building a node for the item that includes the determined values for the item for each of the standard list of attributes for the category for the item;

comparing the node to other nodes of a graph representation of items based on a distance similarity score of the determined values for the item for each of the standard list of attributes for the category for the item;

deleting the node in response to finding a similar node in the graph representation, wherein the similar node satisfies a distance similarity threshold with the node; and updating the graph representation of items in response to not finding the similar node, by adding the node to the graph representation for the item using the values as edges for connecting to the other nodes, wherein each of the edges represent a common value between connected nodes.

8. The non-transitory computer-readable medium of claim 7, wherein the values for the standard list of attributes identifies same items based on common values for all of the attributes of the standard list of attributes.

9. The non-transitory computer-readable medium of claim 8, wherein identifying the same items prevents duplication of nodes in the graph representation.

10. The non-transitory computer-readable medium of claim 7, further comprising instructions for adding a user node connected to the node corresponding to a user entity related to the item.

11. The non-transitory computer-readable medium of claim 10, further comprising instructions for identifying relationships between the user entity and items in the graph representation.

12. A computer-implemented method comprising:

determining, based on a textual description of an object, a taxonomy of the object using a first language model;

determining, based on the textual description and the taxonomy of the object, attributes of the object using a second language model;

creating a node corresponding to the object that includes the determined attributes of the object, deleting the node based on finding a similar node in a graph that satisfies a distance similarity threshold of attributes with the node; and adding, in response to not finding the similar node, the node corresponding to the object to the graph, wherein the node connects to another node of the graph using edges corresponding to common attributes between the connected nodes.

13. The computer-implemented method of claim 12, wherein determining the taxonomy further comprises:

generating embeddings of the textual description using the first language model, wherein the first language model corresponds to a language agnostic sentence transformer model; and matching the embeddings to a closest taxonomy in an embedding space based on a distance similarity measurement.

14. The computer-implemented method of claim 13, wherein matching the embeddings comprises comparing the embeddings to a predetermined set of taxonomy embeddings.

15. The computer-implemented method of claim 14, wherein the predetermined set of taxonomy embeddings are generated from applying the language agnostic sentence transformer model to a set of taxonomies.

16. The computer-implemented method of claim 14, wherein matching the embeddings corresponds to a similarity score above a threshold similarity.

17. The computer-implemented method of claim 12, wherein determining the attributes further comprises:

prompting the second language model with the textual description, the taxonomy, and a list of attributes variables, wherein the second language model corresponds to a large language model; and outputting the attributes based on the prompting.

18. The computer-implemented method of claim 12, wherein determining the attributes of the object provides a standardized description of the object.

19. The computer-implemented method of claim 12, wherein adding the node based on the attributes prevents adding a duplicate node for the object to the graph.

20. The computer-implemented method of claim 12, further comprising connecting a related entity node to the node.

* * * * *